(12) United States Patent
Riseborough

(10) Patent No.: US 10,020,846 B2
(45) Date of Patent: Jul. 10, 2018

(54) DATA MEDIUM FOR CONFIGURING A CONFIGURABLE ELECTRONIC DEVICE BY NEAR FIELD COMMUNICATION, AND ASSOCIATED METHOD

(71) Applicant: GEMALTO SA, Meudon (FR)

(72) Inventor: David Riseborough, Meudon (FR)

(73) Assignee: GEMALTO SA, Meudon (FR)

(*) Notice: Subject to any disclaimer, the term of this patent is extended or adjusted under 35 U.S.C. 154(b) by 0 days.

(21) Appl. No.: 14/654,755

(22) PCT Filed: Dec. 20, 2013

(86) PCT No.: PCT/EP2013/077641
§ 371 (c)(1),
(2) Date: Jun. 22, 2015

(87) PCT Pub. No.: WO2014/096338
PCT Pub. Date: Jun. 26, 2014

(65) Prior Publication Data
US 2015/0333796 A1    Nov. 19, 2015

(30) Foreign Application Priority Data

Dec. 21, 2012  (EP) .................................... 12199200

(51) Int. Cl.
*H04B 5/00*  (2006.01)
*H04B 1/3816*  (2015.01)
(Continued)

(52) U.S. Cl.
CPC ......... *H04B 5/0031* (2013.01); *G06K 7/0008* (2013.01); *G06K 7/10297* (2013.01);
(Continued)

(58) Field of Classification Search
None
See application file for complete search history.

(56) References Cited

U.S. PATENT DOCUMENTS

| | | | |
|---|---|---|---|
| 5,451,763 A * | 9/1995 | Pickett | G06K 7/10326 235/451 |
| 2002/0014535 A1* | 2/2002 | Okada | G06K 7/0013 235/492 |

(Continued)

FOREIGN PATENT DOCUMENTS

| | | |
|---|---|---|
| DE | 19511280 C1 | 7/1996 |
| EP | 2320395 A1 | 5/2011 |
| WO | WO2012038657 A1 | 3/2012 |

OTHER PUBLICATIONS

PCT/EP2013/077641, International Search Report and Written Opinion of the International Searching Authority, dated Apr. 11, 2014, European Patent Office, P.B. 5818 Patentlaan 2 NL—2280 HV Rijswijk.

*Primary Examiner* — Alejandro Rivero
(74) *Attorney, Agent, or Firm* — The Jansson Firm; Pehr B. Jansson

(57) ABSTRACT

A data medium stores a group of data and comprises i) at least a first element suitable for interacting magnetically with a second element, located in the vicinity of a contactless reader comprising a second near field communicator and coupled to an electronic device having at least two predefined configurations, for coupling to this contactless reader, and ii) a first near field communicator arranged for cooperating with the second near field communicator to transfer some data of this group into the contactless reader, so that the electronic device uses the transferred data to configure itself in a predefined configuration corresponding to these transferred data.

9 Claims, 1 Drawing Sheet

(51) Int. Cl.
*G06K 7/00* (2006.01)
*G06K 7/10* (2006.01)
*G06K 19/04* (2006.01)
*H04W 4/80* (2018.01)

(52) U.S. Cl.
CPC ....... *G06K 7/10356* (2013.01); *G06K 19/047* (2013.01); *H04B 1/3816* (2013.01); *H04B 5/0056* (2013.01); *H04W 4/80* (2018.02)

(56) References Cited

U.S. PATENT DOCUMENTS

| | | | |
|---|---|---|---|
| 2002/0073212 A1* | 6/2002 | Sokol | H04L 67/04 709/229 |
| 2002/0118099 A1* | 8/2002 | Oda | G06K 7/0008 340/10.52 |
| 2008/0014867 A1* | 1/2008 | Finn | G06K 7/0008 455/41.1 |
| 2010/0096451 A1* | 4/2010 | Bossoney | G07C 9/00896 235/382 |
| 2012/0323942 A1 | 12/2012 | Iverson | |

* cited by examiner

DATA MEDIUM FOR CONFIGURING A CONFIGURABLE ELECTRONIC DEVICE BY NEAR FIELD COMMUNICATION, AND ASSOCIATED METHOD

TECHNICAL FIELD

The present invention relates to configurable electronic devices or products, and more precisely to the configuration of such electronic devices or products.

One means here by "configurable electronic device" an electronic device or product that may offer at least two different behaviours or sets of functionalities depending on its current configuration chosen by its user amongst several ones.

BACKGROUND OF THE INVENTION

Several solutions have been proposed to allow a user to configure a configurable electronic device so that it offers a behaviour adapted to him or to his habits or present needs.

For instance, it is possible to couple a data medium or carrier to a port of the electronic device. Such a data medium may be a smart card, for instance of the SIM type, that can be inserted into and removed from the electronic device, or an USB device that can be connected to an USB port of the electronic device. This solution appears to be simple for the user, but it requires either an attachment point into the electronic device or an additional connector, which limits the form factor of the electronic device and/or the physical appearance and visibility of the current configuration and/or the reliability of the attachment point to the electronic device.

It is also possible to select a configuration amongst several by providing at least one user access code or identifier to the electronic device. This solution does not require any attachment point in the electronic device or any additional connector, and then does not limit the form factor of the electronic device. But it requires initial interventions of the user to provide his user access code(s) to the electronic device, and does not allow the current configuration to be easily visible on the electronic device exterior.

SUMMARY OF THE INVENTION

An objective of the invention is to improve the situation, and notably to allow a current configuration of an electronic device to be easily visible on its exterior or in its vicinity, an easy and reliable transfer between users or between a vendor and a user, an easy coupling to an electronic device.

To this effect the invention provides notably a data medium, capable of storing a group of data, and comprising:
  at least a first element suitable for interacting magnetically with a second element, located in the vicinity of a contactless reader comprising a second near field communication means and coupled to an electronic device having at least two predefined configurations, for coupling to this contactless reader, and
  a first near field communication means arranged for cooperating with the second near field communication means to transfer some data of this group into the contactless reader, so that the electronic device uses the transferred data to configure itself in a predefined configuration corresponding to these transferred data.

The data medium according to the invention may include additional characteristics considered separately or combined, and notably:

its first element may be chosen from a group comprising at least a magnetized element suitable for cooperating with a magnetized second element, a magnetized element producing a magnetic field suitable for attracting a magnetic second element, and a magnetic element suitable for being attracted by a magnetic field produced by a magnetized second element;
  its first element may be chosen from a group comprising at least a layer fixed to a first support to which its first near field communication means is also fixed, and at least one piece fixed to a first support to which its first near field communication means is also fixed;
  it may constitute a smart card.

The invention also provides an electronic device, having at least two predefined configurations, and comprising:
  at least a second element suitable for interacting magnetically with a first element of a data medium, comprising a first near field communication means and storing a group of data, for coupling to this data medium, and
  a contactless reader located in the vicinity of the second element and comprising a second near field communication means arranged for cooperating with the first near field communication means to retrieve some data of the group from the data medium so that they induce a configuration in a predefined configuration corresponding to them.

The electronic device according to the invention may include additional characteristics considered separately or combined, and notably:

its second element may be chosen from a group comprising at least a magnetized element suitable for cooperating with a magnetized first element, a magnetized element producing a magnetic field suitable for attracting a magnetic first element, and a magnetic element suitable for being attracted by a magnetic field produced by a magnetized first element;
  its second element may be chosen from a group comprising at least a layer fixed to a casing located in front of the second near field communication means, and at least one piece fixed to its contactless reader;
  it may comprise a casing having a recessed section located in front of its contactless reader, to which the second element is fixed, and suitable for receiving the data medium;
  it may comprise at least one light emitting diode suitable for illuminating a part of the data medium from underneath when at least one chosen condition is satisfied;
  it may be chosen from a group comprising at least a communication equipment, a video game console, a set-top box, a residential gateway, a vehicle, a control device of an alarm system, a control device of a power supply installation, an household electrical appliance, an audio and/or video player, a communication modem, a television set, and a hi-fi system.

The invention also provides a method, intended for configuring automatically an electronic device having at least two predefined configurations, and comprising:
  a step (i) during which a data medium, storing a group of data and comprising a first near field communication means, is magnetically coupled to a contactless reader, coupled to the electronic device and comprising a second near field communication means, to trigger a transfer of some data of this group from the data medium to the contactless reader, through the first and second near field communication means, and a step (ii) during which the electronic device uses the transferred data to configure itself in a predefined configuration corresponding to these transferred data.

BRIEF DESCRIPTION OF THE FIGURES

Other features and advantages of the invention will become apparent on examining the detailed specifications hereafter and the appended drawings, wherein.

DETAILED DESCRIPTION OF THE PREFERRED EMBODIMENT

The appended drawings may serve not only to complete the invention, but also to contribute to its definition, if need be.

The invention aims, notably, at offering a data medium DM that can be very easily coupled to a configurable electronic device ED and that is easily visible, and an associated configuration method.

In the following description it will be considered that the electronic device ED is an electronic tablet. But the invention is not limited to this type of electronic device. It concerns a lot of electronic devices, portable or not, and having at least two predefined configurations that can be selected through a coupling with a data medium DM according to the invention. In other words, it concerns any kind of electronic product whose behaviour, or mode of operation, can be affected by the presence of a data medium DM. So, it concerns notably communication devices, such as mobile phones, personal computers and laptops, set-top boxes, residential gateways, video game consoles, vehicles, control devices of alarm systems, control devices of power supply installations, household electrical appliances, audio and/or video players, communication modems, television sets, and hi-fi systems . . . .

Figure 1:
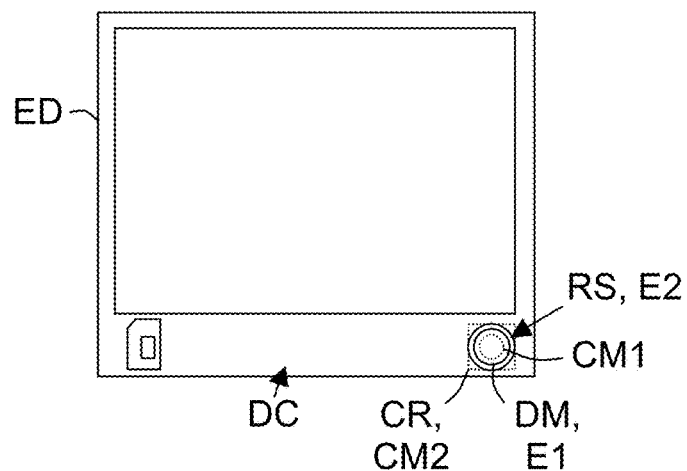
FIG. 1 schematically illustrates an example of electronic device to which a data medium according to the invention is magnetically coupled, FIG. 2 schematically illustrates, in a cross section view, the recess section of the casing of the electronic device of FIG. 1 in which the data medium is magnetically coupled, FIG. 3 schematically illustrates, in a cross section view, a variant of data medium before it is magnetically coupled to a variant of electronic device, and FIG. 4 schematically illustrates the first element and the support of an example of embodiment of data medium according to the invention before they are fixed together.
Figure 2:
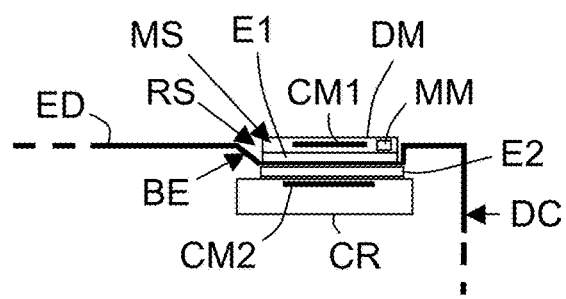

As illustrated in the non-limiting example of embodiment of FIGS. 1 and 2, a data medium DM, according to the invention, comprises at least a first element E1, a first near field communication means CM1, and a memory means MM capable of storing a group of data and accessible to its first near field communication means CM1.

The data medium DM is preferably of a smart card type. Secure smart card technology may ensure the data media DM cannot be easily copied. For instance and as illustrated in the non-limiting example of FIG. 4 it may be a coin-like disk capable of near field communications (NFC). But it may have other shapes, notably square or rectangular. Moreover, it could be a chip card or an integrated circuit card.

Such a data medium DM may be sold separately from the electronic device ED.

The first element E1 is suitable for interacting magnetically with a second element E2, which is located in the vicinity of a contactless reader CR comprising a second near field communication means CM2 and coupled to a configurable electronic device ED, for coupling to this contactless reader CR.

In the non-limiting example of embodiment of FIGS. 1 and 2, the contactless reader CR is located into a casing DC of the electronic device ED, and more precisely under a recessed section RS of a wall of this casing DC. Such a recessed section RS has been designed for receiving the data medium DM above the contactless reader area, and may possibly offer a bevelled edge BE for ease of removal of this data medium DM, as illustrated. But the section of the casing above the contactless reader area could also be flush with the rest of the casing DC. The contactless reader area, where the data medium DM must be magnetically coupled, could be anywhere on the electronic device that is accessible to the user.

In this example, the second element E2 is fixed to the inner face of the recessed section RS in order to be protected. But it could be fixed to the outer face of the recessed section RS, or to the front face of the contactless reader CR, above its second near field communication means CM2.

In a variant of embodiment—not illustrated—the contactless reader CR could be external to the electronic device ED and connected to it through a cable, for instance of a USB type. In this case the second element E2 must be fixed to the front face of the contactless reader CR, above its second near field communication means CM2.

It is important to note that the electronic device ED may have a plurality of built in contactless readers CR or may be coupled to a plurality of external contactless readers CR that are specifically designed for secure attachment and easy removal of a data medium DM.

It is also important to note that the magnetic coupling may results from cooperation between two (pre-) magnetized materials producing respectively magnetic fields with opposite polarities and therefore defining magnets, or between a (pre-)magnetized material and a magnetic material which is attracted by the magnetic field produced by this (pre-)magnetized material.

So, the first element E1 may be a magnetized element suitable for cooperating with a magnetized second element E2, or a magnetized element producing a magnetic field suitable for attracting a magnetic second element E2, or else a magnetic element suitable for being attracted by a magnetic field produced by a magnetized second element E2, for instance.

Figure 3:
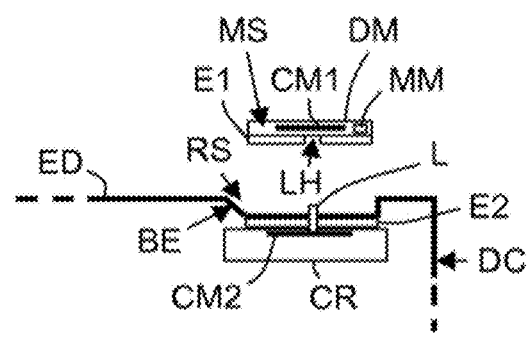
Figure 4:
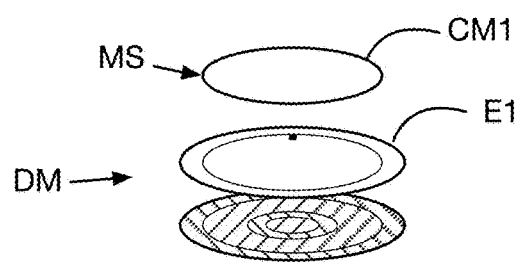

Moreover, the first element E1 may be a layer fixed to a first support MS to which the first near field communication means CM1 is also fixed as illustrated in FIGS. 2 to 4.

As represented in FIG. 4, the first element E1 and the support MS may be two flat layers joined to make a single flat object. In a variant, the first element E1 may comprise at least one piece fixed to this first support MS. Such piece(s) may be located in unused portions of the first support MS of the data medium DM, for instance near the center or around the edges away from the first near field communication means CM1.

In the same way, the second element E2 may be a layer fixed to the casing DC in front of the second near field communication means CM2 as illustrated in FIGS. 2 to 4, or a layer fixed to the contactless reader CR above its second near field communication means CM2, or else at least one piece fixed to the contactless reader CR or even to the casing DC in front of the second near field communication means CM2.

A piece may be a ring, or a part of a ring, for instance.

The strength of the magnetic coupling is chosen in order to allow the data medium DM to stay in place even if the electronic device ED is moved around or turned upside down. In order to optimize the magnetic coupling, the second element E2 may be a magnetized layer comprising concentric rings producing alternating magnetic fields, as illustrated in the non-limiting example of FIG. 4. This allows the data medium DM to adhere to the wall of the casing—here in the recessed section RS—when placed in any orientation.

The first near field communication or NFC means CM1 is arranged for cooperating with the second near field communication means CM2 to transfer some data of the group stored into the memory means MM of the data medium DM, into the contactless reader CR. It must be understood that the data to be transferred are intended to allow a configuration of the electronic device ED in a corresponding predefined configuration. In other words, two different data media DM having two different groups of data will induce respectively, once transferred, two different predefined configurations of the electronic device ED. It is important to note that the behaviour of the electronic device ED may be changed because the data medium DM stores data defining at least one additional functionality in its memory means MM, and/or comprises internal hardware and/or software capable of carrying out at least one additional functionality. For instance, placing the data medium DM on a contactless reader area may unlock hidden functionality(ies) and/or may make available confidential information and/or may allow entering in a specific execution mode.

The first near field communication means CM1 may comprise classically a radiating antenna, possibly in the form of a loop. In the same way, the second near field communication means CM2 may comprise classically a radiating antenna, possibly in the form of a loop.

Once some data of the stored group have been transferred to the contactless reader CR, the electronic device ED can use them to configure itself in the predefined configuration that corresponds to them, as if the transfer had been done between a contact reader and a smart card. So, the near field communications allow the data medium DM to behave almost identically to a contactless smart card, and the reader CR to behave similarly like a contactless smart card reader.

To communicate therebetween the contactless reader CR of the electronic device ED and the data medium DM may carried out the actions describes hereafter.

At the beginning the contactless reader CR is waiting for a data medium DM. Then, when a data medium DM is magnetically attached to the electronic device ED the contactless reader CR may initiate a challenge-response authentication of the attached data medium DM by sending a request to the latter (DM). In response to this request the data medium DM transmits its authentication data to the contactless reader CR, so that it proceeds to their analysis, and then waits for an ID request. If the authentication failed, the contactless reader CR stops the communication and waits until the data medium DM is removed. If the authentication succeeds, the contactless reader CR sends a new request to the data medium DM for requesting its identifier or ID which corresponds to one of the predefined configurations of the electronic device ED. In response to this new request the data medium DM transmits its ID to the contactless reader CR, so that it determines the configuration it corresponds to. If the received ID does not correspond to one of the predefined configurations of the electronic device ED, the contactless reader CR stops the communication and waits until the data medium DM is removed. Now, if the received ID corresponds to one of the predefined configurations of the electronic device ED, the contactless reader CR triggers the configuration of the electronic device ED into the predefined configuration corresponding to the received ID, and then stops the communication.

In an alternative configuration the electronic device ED can poll the contactless reader CR so that the contactless reader CR is not directly controlling the electronic device.

The electronic device ED may be arranged for showing the status of the connection with an attached data medium DM using at least one visual indicator. Such a visual indicator may illuminate and make visible at least one hidden image within the data medium DM to enhance the user experience and provide visual feedback.

As illustrated in the non-limiting example of FIG. 3 a visual indicator may be a light emitting diode or LED L that is integrated into the contactless reader area to illuminate part of the data medium DM from underneath. In this example, the LED L is located above the second near field communication means CM2, go through the second element E2 and the wall of the casing DC in its recessed section RS, and comprises an external part that is intended to be located into a hole LH that is defined into the first element E1.

The invention can also be considered in terms of a method for configuring automatically an electronic device ED having at least two predefined configurations.

Such a method may be implemented by means of a data medium DM and an electronic device ED such as the ones above described with reference to FIGS. 1 to 4. Therefore, only its main characteristics will be mentioned hereafter.

The method according to the invention comprises:
- a step (i) during which a data medium DM, storing a group of data and comprising a first near field communication means CM1, is magnetically coupled to a contactless reader CR coupled to a configurable electronic device ED and comprising a second near field communication means CM2, to trigger a transfer of some data of this group from the data medium DM to this contactless reader CR, through the first CM1 and second CM2 near field communication means, and
- a step (ii) during which the electronic device ED uses the transferred data to configure itself in a predefined configuration corresponding to these transferred data.

For instance, the invention may help a Society to share several identical tablets ED between multiple workers, each having a specific access to predefined applications and specific permissions. In this case, each potential user has his own dedicated data medium DM which allows him to use anyone of the tablets ED for his own tasks once magnetically attached. Each attached data medium DM provides the same secure login capability as a classical smart card based identification system but without affecting the form factor or portability of the tablet ED.

The invention offers several advantages, and notably:
- the data medium allows a more reliable physical coupling to configurable electronic devices than is possible with usual physical connectors such as USB or Thunderbolt,
- the data medium can be instantly identifiable by a possible unique design when attached to an electronic device,
- the data medium can be designed in a way that matches the electronic device's aesthetics and form factor when attached to it,
- several data media may be attached to the same electronic device,
- the data medium is easy to transfer between electronic devices.

The invention is not limited to the embodiments of configuration method, data medium and electronic device described above, only as examples, but it encompasses all alternative embodiments which may be considered by one skilled in the art within the scope of the claims hereafter.

The invention claimed is:

1. A data storage medium, storing a group of data, the data storage medium comprising:
   (i) a first element selected from a group comprising (1) a magnetized element magnetically attracted to magnetized elements, (2) a magnetized element producing a magnetic field that attracts magnetic elements, and (3) a magnetic element attracted by a magnetic field produced by magnetized elements wherein the first element is selected to be magnetically attracted to a second element wherein the second element is magnetized or magnetic, such that when said first element is placed adjacent to said second element the first and second element magnetically couple, said second element located adjacent to a contactless reader located in a recessed section of a wall of an electronic device having at least two predefined configurations associated with different users of the electronic device, the recessed section being adapted to allow the data storage medium to adhere to the wall of the electronic device when placed in any orientation, the electronic device further comprising a second near field communication device, the first element for coupling the data storage medium to said contactless reader by magnetic attraction to the second element, and
   (ii) a first near field communication device that transmits some data of said group of data into said contactless reader via said second near field communication device, said some data corresponding to a predefined configuration associated to a user of said electronic device, and associated with said data storage medium, the coupling of said data storage medium to said contactless reader triggering the electronic device to be configured into said predefined configuration associated to said user corresponding to said transferred data.

2. The data storage medium according to claim 1, wherein said first element is chosen from a group comprising at least a layer fixed to a first support to which said first near field communication device is also fixed, and at least one piece fixed to a first support to which said first near field communication device is also fixed.

3. The data storage medium according to claim 1, wherein the data storage medium constitutes a smart card.

4. An electronic device having at least two predefined configurations, comprising
   (i) a second element located in a recessed section of a wall of the electronic device the recessed section being adapted to allow a data storage medium to adhere to the wall of the electronic device when placed in any orientation, the electronic device having at least two predefined configurations and wherein the at least two predefined configurations are associated to at least two different users of the electronic device, respectively, and magnetically attracted to a first element of the data storage medium wherein the first element is selected from a group comprising (1) a magnetized element magnetically attracted to magnetized elements, (2) a magnetized element producing a magnetic field that attracts magnetic elements, and (3) a magnetic element attracted by a magnetic field produced by magnetized elements wherein the first element is selected to be magnetically attracted to a second element wherein the second element is magnetized or magnetic, such that when said first element is placed adjacent to said second element the first and second element magnetically couple by magnetic attraction to the second element, said data storage medium comprising a first near field communication device and storing a group of data, said second element for coupling a contactless reader to said data storage medium, and
   (ii) said contactless reader located adjacent to said second element and comprising a second near field communication device to retrieve some data of said group of data from said data storage medium via said first near field communication device wherein said electronic device configures itself based on a predefined configuration associated to a user corresponding to said some data of said group of data retrieved from said data storage medium.

5. The electronic device according to claim 4, wherein said second element is chosen from a group comprising at least a layer fixed to a casing located in front of said second near field communication device, and at least one piece fixed to said contactless reader.

6. The electronic device according to one of claim 4 or 5, comprising a casing having a recessed section located in front of said contactless reader, to which said second element is fixed, and configured to receive said data storage medium.

7. The electronic device according to claim 4, further comprising a light emitting diode, which illuminates a part of said data storage medium from underneath when at least one chosen condition is satisfied.

8. The electronic device according to claim 4, wherein the electronic device is selected from a group comprising at least a communication equipment, a video game console, a set-top box, a residential gateway, a vehicle, a control device of an alarm system, a control device of a power supply installation, a household electrical appliance, an audio and/or video player, a communication modem, a television set, and a hi-fi system.

9. A method for configuring automatically an electronic device having at least two predefined configurations, comprising:
   i) magnetically coupling a data storage medium, storing a group of data and comprising a first near field communication device to a contactless reader coupled to said electronic device comprising a second near field communication device, wherein said magnetical coupling is achieved by:
      providing said data storage medium with a first element selected from a group comprising (1) a magnetized element magnetically attracted to magnetized elements, (2) a magnetized element producing a magnetic field that attracts magnetic elements, and (3) a magnetic element attracted by a magnetic field produced by magnetized elements wherein the first element is selected to be magnetically attracted to a second element wherein the second element is magnetized or magnetic, said first element located adjacent to said first near field communication device and said second element located in a recessed section of a wall of the electronic device adjacent to said contactless reader, the recessed section being adapted to allow the data storage medium to adhere to the wall of the electronic device when placed in any orientation; and
      placing said data storage medium against said electronic device such that magnetic attraction between said first element and said second element causes said first element and said second element to be magnetically coupled and such that said first near field communication device is placed within communication range of said contactless reader;

ii) in response to such magnetical coupling, triggering a transfer of some data of said group from said data storage medium to said contactless reader, said some data corresponding to a predefined configuration associated to a user of said electronic device, through said first and second near field communication device; and iii) in response to such transferring of said some data of said group, operating said electronic device to use said transferred data to configure itself in a predefined configuration of said at least two predefined configurations corresponding to said transferred data and associated to said user, wherein the at least two predefined configurations are associated with different users of the electronic device, respectively.

\* \* \* \* \*